United States Patent
Yamada et al.

(10) Patent No.: US 11,634,225 B2
(45) Date of Patent: Apr. 25, 2023

(54) INFORMATION-PROCESSING DEVICE AND INFORMATION-PROCESSING METHOD

(71) Applicant: NTT DOCOMO, INC., Tokyo (JP)

(72) Inventors: Takefumi Yamada, Tokyo (JP); Ken Koumoto, Tokyo (JP); Hidetoshi Ebara, Tokyo (JP); Youhei Oono, Toyko (JP); Yuichiro Segawa, Toyko (JP); Yukiko Nakamura, Toyko (JP); Shinya Hanano, Toyko (JP)

(73) Assignee: NTT DOCOMO, INC., Tokyo (JP)

( * ) Notice: Subject to any disclaimer, the term of this patent is extended or adjusted under 35 U.S.C. 154(b) by 323 days.

(21) Appl. No.: 16/955,216

(22) PCT Filed: Jan. 22, 2019

(86) PCT No.: PCT/JP2019/001812
§ 371 (c)(1),
(2) Date: Jun. 18, 2020

(87) PCT Pub. No.: WO2019/146579
PCT Pub. Date: Aug. 1, 2019

(65) Prior Publication Data
US 2020/0331607 A1     Oct. 22, 2020

(30) Foreign Application Priority Data

Jan. 23, 2018   (JP) .............................. JP2018-009013

(51) Int. Cl.
*B64C 39/02*     (2023.01)
*B64F 5/60*      (2017.01)
*B64U 101/00*    (2023.01)

(52) U.S. Cl.
CPC ............. *B64C 39/024* (2013.01); *B64F 5/60* (2017.01); *B64U 2101/00* (2023.01)

(58) Field of Classification Search
CPC ..... B64C 39/024; B64C 2201/12; B64F 5/60; G08G 5/0013; G08G 5/0039;
(Continued)

(56) References Cited

U.S. PATENT DOCUMENTS

2013/0226373 A1     8/2013   Bollapragada et al.

FOREIGN PATENT DOCUMENTS

JP       2004336408 A        11/2004
JP       2012/037204 A    *   2/2012   ............ F41H 11/136
(Continued)

OTHER PUBLICATIONS

International Search Report issued in corresponding PCT Application No. PCT/JP2019/001812, dated May 7, 2019, 4 pages.
(Continued)

*Primary Examiner* — Brian P Sweeney
(74) *Attorney, Agent, or Firm* — Dilworth IP, LLC

(57) ABSTRACT

Flight cessation detection unit detects that drone has ceased flying at an unexpected site. Situation information acquisition unit acquires, as situation information indicating a situation related to retrieval of the drone, information on weather in an area in which the drone has flown. Retrieval procedure determination unit determines a retrieval procedure for the drone based on a situation indicated by the acquired situation information. Retrieval procedure determination unit, upon detecting a time period having specific weather based on the acquired information on weather, determines a retrieval procedure in which the time period is designated as a retrieval time.

9 Claims, 8 Drawing Sheets

(58) Field of Classification Search
CPC .. G08G 5/0056; G08G 5/0082; G08G 5/0091; G08G 5/025; G08G 5/0034; G08G 5/0069

See application file for complete search history.

(56) References Cited

FOREIGN PATENT DOCUMENTS

| | | |
|---|---|---|
| JP | 2012037204 A | 2/2012 |
| JP | 2013177120 A | 9/2013 |
| JP | 2016194844 A | 11/2016 |
| WO | 2017208468 A | 12/2017 |

OTHER PUBLICATIONS

Notice of Reasons for Refusal issued in corresponding Japanese Patent Application No. 2019-567081, dated Jul. 20, 2021.

* cited by examiner (a)

| SPEED | DAMAGE LEVEL |
|---|---|
| LESS THAN Th1 | LESS THAN REFERENCE LEVEL |
| EQUAL TO OR GREATER THAN Th1 | EQUAL TO OR GREATER THAN REFERENCE LEVEL |

(b)

| CHASSIS DISTORTION | DAMAGE LEVEL |
|---|---|
| LESS THAN Th2 | LESS THAN REFERENCE LEVEL |
| EQUAL TO OR GREATER THAN Th2 | EQUAL TO OR GREATER THAN REFERENCE LEVEL |

(c)

| WEIGHT CHANGE | DAMAGE LEVEL |
|---|---|
| LESS THAN Th3 | LESS THAN REFERENCE LEVEL |
| EQUAL TO OR GREATER THAN Th3 | EQUAL TO OR GREATER THAN REFERENCE LEVEL |

(d)

| CURRENT LEAK | DAMAGE LEVEL |
|---|---|
| LESS THAN Th4 | LESS THAN REFERENCE LEVEL |
| EQUAL TO OR GREATER THAN Th4 | EQUAL TO OR GREATER THAN REFERENCE LEVEL |

(e)

| EMERGENCY LANDING INFORMATION | DAMAGE LEVEL |
|---|---|
| PRESENT | LESS THAN REFERENCE LEVEL |
| ABSENT | EQUAL TO OR GREATER THAN REFERENCE LEVEL |

FIG. 9

| LANDING SITE | POSITION INFORMA- TION | ATTRIBUTES OF LANDING SITE | | |
|---|---|---|---|---|
| | | ATTRIBUTE TYPE | TIME ZONE | |
| PARK α | LATITUDE XX LONGITUDE YY | POPULATION DENSITY | WEEKDAY DAYTIME | N11 PEOPLE/m2 |
| | | | WEEKDAY EVENING | N12 PEOPLE/m2 |
| | | | ALL DAY ON HOLIDAYS | N13 PEOPLE/m2 |
| | | TRAFFIC AMOUNT | WEEKDAY DAYTIME | N21 VEHICLE/HOUR |
| | | | WEEKDAY EVENING | N22 VEHICLE/HOUR |
| | | | ALL DAY ON HOLIDAYS | N23 VEHICLE/HOUR |
| | | AREA | | AREA A11 |
| | | INCLINATION | | θ11 |
| ⋯ | ⋯ | ⋯ | ⋯ | ⋯ |

FIG. 10

| ATTRIBUTE TYPE | PREDETERMINED ATTRIBUTE |
|---|---|
| POPULATION DENSITY | LESS THAN N1 PEOPLE/m2 |
| TRAFFIC AMOUNT | LESS THAN N2 VEHICLES/HOUR |
| AREA | EQUAL TO OR GREATER THAN AREA A1 |
| INCLINATION | LESS THAN $\theta 1$ |

FIG. 11

INFORMATION-PROCESSING DEVICE AND INFORMATION-PROCESSING METHOD

TECHNICAL FIELD

The present invention relates to a technique for managing aerial vehicles.

BACKGROUND ART

Japanese Patent Application No. JP 2013-177120 A1 discloses a technique for calculating flight trajectories for an aircraft based on current status data and flight plan data, calculating costs required for completing a flight plan for each of the flight trajectories, and selecting from among the flight trajectories one of acceptable and lowest cost, along which the aircraft is to fly.

SUMMARY OF THE INVENTION

An aerial vehicle such as a drone is caused to fly in accordance with a flight plan. If an unexpected event occurs such as a strong wind or a failure, the aerial vehicle may cease flight and descend to an unforeseen location. When such a situation occurs, it is necessary to retrieve the aerial vehicle.

An object of the present invention is to retrieve an aerial vehicle that has unexpectedly ceased flight, by use of a procedure appropriate for a situation.

To achieve the objective, the present invention provides an information-processing device comprising: a detection unit configured to perform detection related to cessation of flight of an aerial vehicle at an unexpected site; an acquisition unit configured to acquire situation information indicating a situation related to retrieval of the aerial vehicle for which the detection has been performed; a determination unit configured to determine a retrieval procedure for the aerial vehicle for which the detection has been performed, based on a situation indicated by acquired situation information; and a processing unit configured to perform processing for executing a determined retrieval procedure.

The acquisition unit may be configured to acquire, as situation information, information on weather in an area in which the aerial vehicle for which the detection has been performed flies or has flown, and the determination unit may be configured, upon detecting a time period having specific weather based on acquired information on weather, to determine a retrieval procedure in which the time period is designated as a retrieval time.

The acquisition unit may be configured to acquire, as situation information, information indicating a level of damage that is caused to a retrieval target including the aerial vehicle when the aerial vehicle ceases its flight, and the determination unit may be configured, upon detecting that acquired situation information indicates a level of damage smaller than a predetermined reference level, to determine a retrieval procedure in which the retrieval target is retrieved using another aerial vehicle capable of transporting the retrieval target, and may also be configured, upon detecting that the level of damage is equal to or greater than the predetermined reference level, to determine a retrieval procedure in which the retrieval target is retrieved using a means other than the other aerial vehicle.

The acquisition unit may be configured to acquire, as situation information, information indicating a weight of a retrieval target including the aerial vehicle for which the detection has been performed, and the determination unit may be configured, upon detecting that acquired situation information indicates a weight smaller than a threshold value, to determine a retrieval procedure in which the retrieval target is retrieved using another aerial vehicle capable of transporting the retrieval target, and may also be configured, upon detecting that the weight is equal to or greater than the threshold value, to determine a retrieval procedure in which the retrieval target is retrieved using a means other than the other aerial vehicle.

The acquisition unit may be configured to acquire, as situation information, information indicating whether the aerial vehicle for which the detection been performed holds an object to be transported, and the determination unit may be configured, upon detecting that acquired situation information is indicative that the aerial vehicle for which the detection been performed holds no object to be transported, to determine a retrieval procedure in which the aerial vehicle is retrieved using another aerial vehicle capable of transporting the aerial vehicle, and may also be configured, upon detecting that the aerial vehicle for which the detection been performed holds an object to be transported, to determine a retrieval procedure in which a retrieval target including the aerial vehicle is retrieved using a means other than the other aerial vehicle.

The acquisition unit may be configured to acquire, as situation information, information indicating an attribute of an object transported by the aerial vehicle for which the detection has been performed, and the determination unit may be configured, upon detecting that acquired situation information indicates a predetermined attribute, to determine a retrieval procedure in which the aerial vehicle for which the detection has been performed is retrieved using another aerial vehicle capable of transporting the aerial vehicle, and may also be configured, upon detecting that the acquired situation information does not indicate the predetermined attribute, to determine a retrieval procedure in which a retrieval target including the aerial vehicle for which the detection has been performed is retrieved using a means other than the other aerial vehicle.

The acquisition unit may be configured to acquire, as situation information, information indicating whether the aerial vehicle for which the detection has been performed has a function for unloading an object held by the aerial vehicle, and the determination unit may be configured, upon detecting that acquired situation information is indicative that the aerial vehicle for which the detection been performed has the function, to determine a retrieval procedure in which the object is unloaded using the function and a retrieval procedure in which the object is retrieved using another aerial vehicle capable of transporting the object.

The acquisition unit may be configured to acquire, as situation information, information indicating an attribute of a site at which the aerial vehicle for which the detection been performed can land, the site being within an area including a current position of the aerial vehicle, and the determination unit may be configured to determine a retrieval procedure in which the aerial vehicle for which situation information indicating a predetermined attribute has been acquired is caused to land at a site having the predetermined attribute.

The present invention provides an information-processing method comprising: performing detection related to cessation of flight of an aerial vehicle at an unexpected site; acquiring situation information indicating a situation related to retrieval of the aerial vehicle for which the detection has been performed; determining a retrieval procedure for the aerial vehicle for which the detection has been performed, based on a situation indicated by the acquired situation information; and performing processing for executing the determined retrieval procedure.

The present invention makes it possible to retrieve an aerial vehicle that has unexpectedly ceased flight, by use of a procedure appropriate for a situation.

BRIEF DESCRIPTION OF THE DRAWINGS

FIG. 9 is a diagram showing an example of a damage level table of the present invention.

FIG. 10 is a diagram showing an example of a landing site table of the present invention.

FIG. 11 is a diagram showing an example of an attribute table of the present invention.

DETAILED DESCRIPTION

[1] Embodiment

Figure 1:
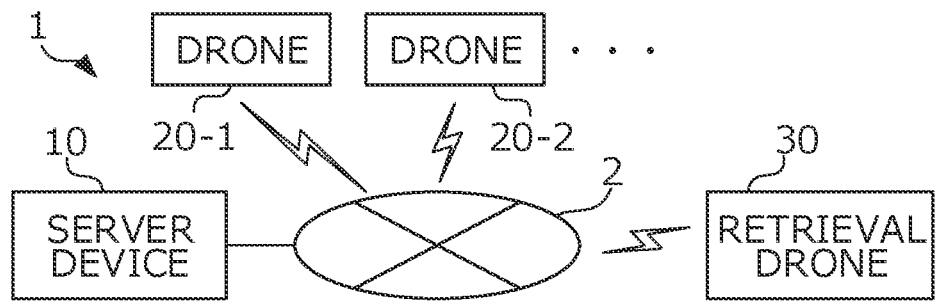
FIG. 1 is a diagram showing a configuration of a drone management system according to an embodiment of the present invention.

FIG. 1 shows a configuration of drone management system 1 according to an embodiment, which is a system for managing drones. A drone is an unmanned device that can fly autonomously according to a flight plan, and is an example of an "aerial vehicle" according to the present invention. The drone is used for the purpose of transporting an object, taking a photo from the air, or monitoring an area.

Drone management system 1 includes network 2, server device 10, drones 20-1, 20-2, . . . (when not distinguished from each other, referred to as "drone 20"), and retrieval drone 30. Network 2 is a communication system including a mobile communication network and the Internet, and relays data exchanged between the devices that have access to the system. Server device 10 accesses network 2 by wired or wireless communication, and drone 20 and retrieval drone 30 access network 2 by wireless communication.

Server device 10 is an information-processing device that performs various processes for managing drones 20. Server device 10 performs, for example, a process for creating a flight plan indicating a flight route for drone 20, and a process for instructing the drone 20 to fly in accordance with the created flight plan. Each of drone 20 and retrieval drone 30 is a rotary-wing aerial vehicle that includes one or more rotary wings and flies by rotating the rotary wings.

Drone 20 has a function suitable for its flight purpose. For example, drone 20 used for transportation purpose has a function for holding an object and discharging it at a destination. Drone 20 also has a function for flying in accordance with a flight plan; however, flight cessation may occur within an unexpected area due to flight problems or an accident. Retrieval drone 30 has a function for retrieving drone 20 that has ceased flight. In the present embodiment, drone 20 that has ceased flight is retrieved by retrieval drone 30 or a retrieval staff member to be transported to, for example, a retrieval center.

Typically, the retrieval staff member goes to retrieve the drone 20 by use of a vehicle such as a car. Typically, the vehicle used by the retrieval staff member rides is a land vehicle; however, the vehicle may be an aircraft such as a helicopter or a water-borne vehicle such as a boat. The retrieval carried out by the retrieval staff member is manual retrieval conducted by use of any available transport routes such as via land, via flight, or via water. In contrast, retrieval performed by retrieval drone 30 is unmanned retrieval conducted via flight.

Figure 2:
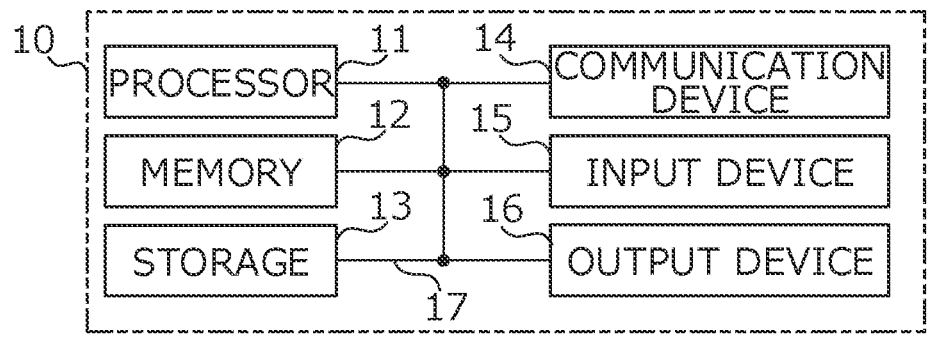
FIG. 2 is a diagram showing a hardware configuration of a server device, in accordance to the present invention.

FIG. 2 shows a hardware configuration of server device 10, which is a computer including processor 11, memory 12, storage 13, communication device 14, input device 15, output device 16, and bus 17. It is of note that the term "device" may refer to a circuit or a unit. It is also of note that there may be one or more of each of the devices, and some of the devices may not be included.

Processor 11 controls a computer, for example, by causing an operating system to run. Processor 11 may include a central processing unit (CPU) that includes interfaces for connection to peripheral devices, a control device, an arithmetic device, and a register. Processor 11 retrieves programs (program codes), software modules, and data from storage 13 and/or communication device 14 to memory 12, and performs various processing based on them.

The number of processors 11 for performing a variety of processing may be one or more, and two or more processors 11 may perform a variety of processing simultaneously or sequentially. Processor 11 may be composed of one or more chips. The programs may be transmitted from a network via a telecommunication line.

Memory 12 is a computer-readable recording medium, and may include at least one of a read only memory (ROM), an erasable programmable ROM (EPROM), an electrically erasable programmable ROM (EEPROM), and a random access memory (RAM). Memory 12 may be referred to as a register, a cache, or a main memory (a main storage device). Memory 12 can store the programs (program codes), the software modules, and the data.

Storage 13 is a computer-readable recording medium, and may include at least one of an optical disk such as a compact disc ROM (CD-ROM), a hard disk drive, a flexible disk, a magneto-optical disk (for example, a compact disk, a digital versatile disk, a Blu-ray (registered trademark) disk), a smart card, a flash memory (for example, a card, a stick, a key drive), a floppy (registered trademark) disk, and a magnetic strip.

Storage 13 may be referred to as an auxiliary storage device. The recording medium may refer to a database including memory 12 and/or storage 13, a server, or any other suitable medium. Communication device 14 is hardware (a transmission/reception device) for enabling communication between computers via a wired and/or wireless network, and is also referred to as, for example, a network device, a network controller, a network card, or a communication module.

Input device 15 is an input device for receiving input, such as a keyboard, a mouse, a microphone, a switch, a button, or a sensor. Output device 16 is a device for performing output, such as a display or a speaker. It is of note that input device 15 and output device 16 may together constitute a device such as a touch screen. The devices such as processor 11 and memory 12 can access each other via bus 17 that enables communication. Bus 17 may be a single bus, or may include plural buses that connect the devices.

Figure 3:
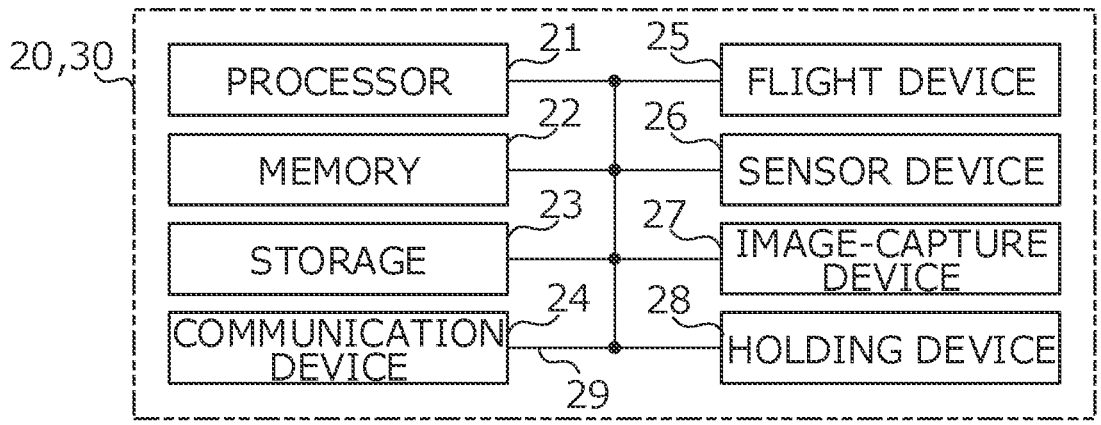
FIG. 3 is a diagram showing a hardware configuration each of a drone and a retrieval drone, in accordance to the present invention.

FIG. 3 shows a hardware configuration each of drone 20 and retrieval drone 30, each of which is a computer including processor 21, memory 22, storage 23, communication device 24, flight device 25, sensor device 26, image capture device 27, holding device 28, and bus 29. It is of note that the term "device" may be read as a circuit or a unit. It is also of note that there may be one or more of each of the devices, and some of the devices may not be included.

Each of processor 21, memory 22, storage 23, communication device 24, and bus 29 is the same type of hardware (performance and specifications are not necessarily the same) as a device having the same name shown in FIG. 2. Communication device 24 enables wireless communication between drones in addition to wireless communication with network 2. Flight device 25 is a device for enabling the drone to fly, and includes rotors and driving means such as motors for rotating the rotors. Flight device 25 enables the drone to move in any direction in the air, or to hover in the air.

Sensor device 26 is a device including sensors for acquiring information necessary for flight control. Sensor device 26 includes a position sensor for measuring a position (a latitude and a longitude) of the drone, a direction sensor for measuring a direction in which (the front side of) the drone faces, an altitude sensor for measuring an altitude of the drone, and a speed sensor for measuring a speed of the drone.

Sensor device 26 also includes sensors for detecting an abnormality, which include, for example, a heat sensor for detecting an abnormal temperature, a vibration sensor for detecting an abnormal vibration, a disconnection detection sensor for detecting disconnection of wiring, and a water leakage sensor for detecting entry of water into the chassis in which electronic components are provided. Image capture device 27 is a device including a lens and an image sensor for capture of an image of a surrounding area. Image capture device 27 is used when the drone flies for the purpose of, for example, photography or surveillance.

Holding device 28 of drone 20 is a device for holding an object to be transported by the drone 20, and is used when the drone 20 flies for the purpose of, for example, transportation. Holding device 28 of retrieval drone 30 is a device for holding drone 20. A means for holding an object or drone 20 includes a net, a string, arms, a table, or a container. In the present embodiment, arms are used.

Figure 4:
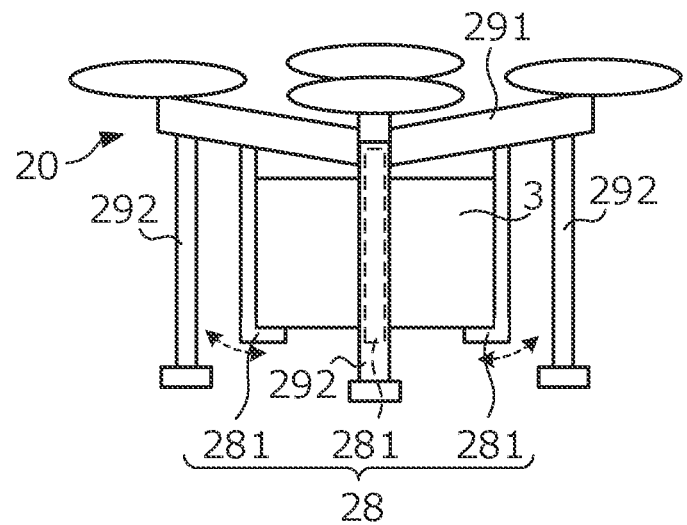
FIG. 4 is a diagram showing an appearance of the drone, in accordance to the present invention.

FIG. 4 shows an appearance of drone 20, which includes chassis 291 including four landing legs 292, and holding device 28 including four openable arms 281 mounted to chassis 291. FIG. 4 shows drone 20 with arms 281 closed with object 3 held therebetween. The drone 20 flies in the state shown. The drone 20, upon landing at a destination site, opens arms 281 to release object 3 at the destination site. To prevent object 3 from being damaged by impact upon release, landing legs 292 can be extended or shortened either manually or automatically proportionate to a size of object 3.

Figure 5:
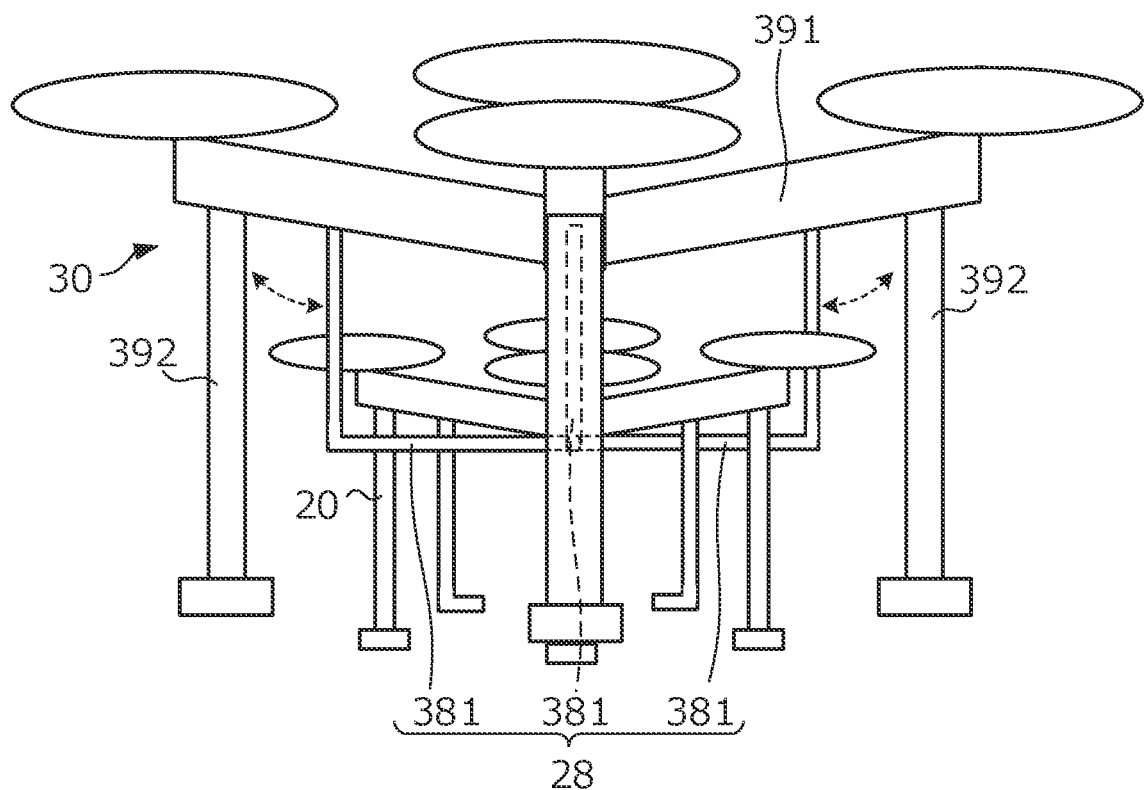
FIG. 5 is a diagram showing an appearance of the retrieval drone, in accordance to the present invention.

FIG. 5 shows an appearance of retrieval drone 30, with chassis 391 that is equipped with four landing legs 392, and with holding device 28 at chassis 391 that is equipped with four openable arms 381. FIG. 5 shows retrieval drone 30 with arms 381 closed with drone 20 held therebetween. Retrieval drone 30 flies in the state shown. Retrieval drone 30 lands with arms 381 open in such a manner that landing legs 392 surround drone 20, and holds drone 20 upon closing arms 381. Landing legs 392 can be extended or shortened according to a height of the body of drone 20 relative to the ground.

It is also of note that each of server device 10, drone 20, and retrieval drone 30 may include hardware such as a microprocessor, a digital signal processor (DSP), an application specific integrated circuit (ASIC), a programmable logic device (PLD), or a field programmable gate array (FPGA). The hardware may include some or all of the functional blocks. For example, processor 11 may be composed of at least one of the items of the hardware.

Each of server device 10, drone 20, and retrieval drone 30 included in drone management system 1 stores a program for the system, and a processor of each device executes a corresponding program to control a component, and thereby provides functions described below.

Figure 6:
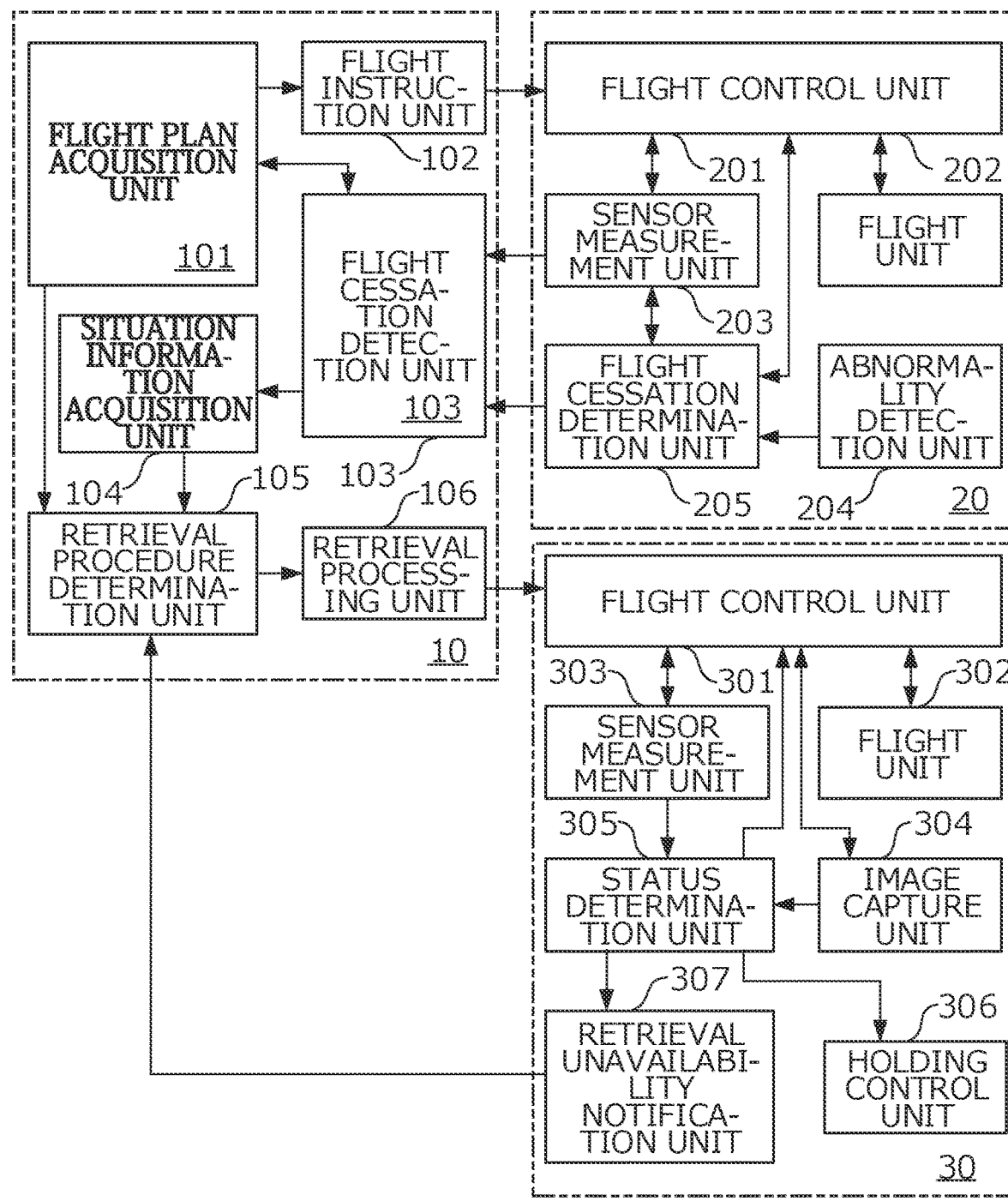
FIG. 6 is a diagram showing a functional configuration of the drone management system, in accordance to the present invention.

FIG. 6 shows a functional configuration of drone management system 1. Although FIG. 6 shows only one drone 20, it is assumed that each of drones 20 have the same functions.

Server device 10 includes flight plan acquisition unit 101, flight instruction unit 102, flight cessation detection unit 103, situation information acquisition unit 104, retrieval procedure determination unit 105, and retrieval processing unit 106. Drone 20 includes flight control unit 201, flight unit 202, sensor measurement unit 203, abnormality detection unit 204, and flight cessation determination unit 205. Retrieval drone 30 includes flight control unit 301, flight unit 302, sensor measurement unit 303, image capture unit 304, status determination unit 305, hold control unit 306, and retrieval unavailability notification unit 307.

Flight control unit 201 of drone 20 controls flight of the drone 20. Specifically, flight control unit 201 controls flight of the drone 20 in accordance with a flight path and a flight time period indicated by a flight plan (described later), in response to a flight instruction received from server device 10. Flight unit 202 is a function for enabling the drone 20 to fly. In the present embodiment, flight unit 202 enables the drone 20 to fly by use of the rotors and driving means included in flight device 25.

Sensor measurement unit 203 measures a position, a direction, an altitude, and a speed of the drone 20 at predetermined time intervals by use of the sensors (the position sensor, the direction sensor, the altitude sensor, and the speed sensor) included in the drone 20. Sensor measurement unit 203 provides sensor information indicating the measured position, direction, altitude, and speed to flight control unit 201. Flight control unit 201 controls flight unit 202 based on the provided sensor information so that the drone 20 flies along a flight path indicated by a flight plan.

Flight plan acquisition unit 101 of server device 10 acquires a flight plan for the drone 20. A flight plan used for a flight for transportation consists of information on a flight path from a departure site to a destination site and a flight time period for completing travel along the flight path. A flight plan used for a flight the object of which is photography or surveillance consists of information on a flight path and a flight time period taken for a round trip flight to a photography or monitoring site, and a flight path and a flight time for a flight within the site. A flight plan is associated with identification information (for example, a drone ID) of drone 20 that flies in accordance with the flight plan.

Flight plan acquisition unit 101 acquires a flight plan, for example, from a system of a business operator using the drone 20, and provides the acquired flight plan to flight instruction unit 102 and retrieval procedure determination unit 105. Flight instruction unit 102 provides a flight instruction to the drone 20 based on the acquired flight plan. For example, flight instruction unit 102 sends instruction data indicating flight control information to the drone 20 so that the drone 20 can fly a flight route indicated by the flight plan during a flight time period indicated by the flight plan. The flight control information indicates flight directions, flight altitudes, flight speeds, a flight start time, and a flight end time.

Upon receiving the sent instruction data, flight control unit 201 of the drone 20 controls flight of the drone 20 according to the flight plan, based on the flight control information indicated by the instruction data. Abnormality detection unit 204 of the drone 20 detects an abnormality in the drone 20 such as an abnormal temperature, an abnormal vibration, a disconnection, or a water leakage. Abnormality detection unit 204 detects an abnormality based on outputs of the abnormality detection sensors included in sensor device 26, and notifies an output value that is abnormal to flight cessation determination unit 205.

The output value indicates a level of abnormality. Specifically, the output value indicates a temperature in a case where an abnormality in temperature is detected, a number of vibrations in a case where an abnormality in vibration is detected, a disconnection position in a case where a disconnection is detected, and an amount of leaked water in a case where a water leakage is detected. Flight cessation determination unit 205, when an abnormality is detected in the drone 20, determines whether flight should cease. To make the determination, for example, flight cessation determination unit 205 acquires destination position information and flight route information from flight control unit 201, and acquires current position information from sensor measurement unit 203.

Flight cessation determination unit 205 calculates a remaining flight distance to a destination based on the acquired information, and determines whether it is possible to fly with the detected abnormality. To make the determination, flight cessation determination unit 205, for example, pre-stores a table in which abnormality levels are associated with maximum flight distances. In the table, for example, a higher abnormal temperature is associated with a shorter maximum flight distance. Flight cessation determination unit 205 identifies a maximum flight distance associated with the abnormality level indicated by the output value notified by abnormality detection unit 204. Upon identifying the maximum flight distance, flight cessation determination unit 205 determines whether the remaining flight distance is longer than the maximum flight distance. When a result of the determination is affirmative, flight cessation determination unit 205 determines that the flight should cease.

Upon making the determination, flight cessation determination unit 205 notifies the determination to flight control unit 201. Upon receiving the notification, the flight control unit 201 causes the drone 20 to fly to land at a safe landing site. Flight control unit 201, for example, pre-stores map data indicating safe emergency landing sites such as a park, a riverbank, and a seacoast. Flight control unit 201 refers to the map data to decide an emergency landing site closest to a current position, and cause the drone 20 to land at the site.

Upon deciding the emergency landing site, flight cessation determination unit 205 sends a set of position information indicating the site and identification information of the drone 20 (for example, a drone ID) to server device 10 as emergency landing information. Flight cessation determination unit 205 may send the emergency landing information either before or after the landing. The drone 20, even in a case where it cannot continue its flight, can perform communication unless there is a failure. The sent emergency landing information is provided to flight cessation detection unit 103 of server device 10.

Flight cessation detection unit 103 performs detection related to cessation of flight of the drone 20 at an unexpected site. Flight cessation detection unit 103 is an example of a "detection unit" according to the present invention. In the present embodiment, the unexpected site refers to a site other than a departure site and a destination lace of a flight route indicated by a flight plan. The detection related to cessation of flight herein includes detecting that the drone 20 has ceased flight (detection of flight cessation) and detecting that the drone 20 is expected to cease flight (detection of probable cessation of flight).

Flight cessation detection unit 103, upon receiving the emergency landing information sent after landing, detects cessation of flight, and upon receiving the emergency landing information sent before landing, detects probable cessation of flight. Upon receiving the emergency landing information sent from the drone 20, flight cessation detection unit 103 performs detection related to cessation of flight of the drone 20 identified by a drone ID indicated by the emergency landing information, at an unexpected location (the emergency landing site indicated by the emergency landing information).

The drone 20 may cease flight due to a gust of wind or a collision with an obstacle such as a building, a bird, or another drone. Despite occurrence of such a problem, output values of the abnormality detection sensors may not indicate any abnormality, for example, in a situation where the drone 20 remains flight-capable but is unable to take off since it is snagged in a tree. In such a case, flight cessation determination unit 205 fails to determine cessation of flight so that emergency landing information is not sent.

In preparation for such a case, sensor measurement unit 203 of the drone 20 sends sensor information including a drone ID of the drone 20 to server device 10 at predetermined time intervals. The sensor information is provided to flight cessation detection unit 103. Flight cessation detection unit 103, upon detecting that a speed indicated by the sensor information is zero, acquires a flight plan associated with the drone ID included in the sensor information from flight plan acquisition unit 101.

Flight cessation detection unit 103, upon detecting that a position indicated by the sensor information is not a departure site or a destination site indicated by the flight plan, detects that the drone 20 that has sent the sensor information has ceased flying at an unexpected location (the position indicated by the sensor information). After performing the detection, flight cessation detection unit 103 provides stop position information indicating a position at which the drone 20 has ceased flying, which information includes the drone ID of the drone 20, to situation information acquisition unit 104.

Situation information acquisition unit 104 acquires situation information indicating a situation related to retrieval of the drone 20 for which detection related to cessation of flight has been performed. Situation information acquisition unit 104 is an example of an "acquisition unit" according to the present invention. The drone 20 that has ceased flying is retrieved by a retrieval staff member (for example, the business operator flying drone 20s or an agent commissioned by the business operator) or retrieval drone 30, as described above.

In the present embodiment, situation information acquisition unit 104 acquires, as situation information, information on weather in an area in which the drone 20 for which detection related to cessation of flight has been performed flies or has flown. The information on weather indicates: weather such as sunny, cloudy, rain, or snow; weather elements such as wind strength, rainfall, snowfall, temperature, humidity, and so forth; and a corresponding time or time zone. Situation information acquisition unit 104 acquires a weather forecast of an area including a stop position indicated by the stop position information, as weather-related information (situation information).

Situation information acquisition unit 104 may acquire, instead of the weather forecast, information indicating current weather (for example, current weather information posted by a user on the Internet) as weather-related information. Alternatively, information indicating current weather may be acquired in another way. For example, the drone 20 for which detection related to cessation of flight has been performed may be provided with sensors such as a wind speed sensor, a rainfall sensor, or a snowfall sensor, and may send measured values of the sensors to server device 10.

Situation information acquisition unit 104 may acquire information on current weather or weather elements indicated by the measured values, as weather-related information. Situation information acquisition unit 104 provides the acquired weather-related information to retrieval procedure determination unit 105. Retrieval procedure determination unit 105 determines a retrieval procedure for the drone 20 for which detection related to cessation of flight has been performed, based on a situation indicated by situation information. Retrieval procedure determination unit 105 is an example of a "determination unit" according to the present invention.

In the present embodiment, retrieval procedure determination unit 105, upon detecting a time period having specific weather based on acquired weather-related information, determines a procedure in which the time period is designated as a retrieval time. The specific weather herein refers to weather suitable for retrieval. For example, weather suitable for correction performed by retrieval drone 30 refers to weather suitable for flight of a drone such as weather that is sunny or cloudy, with a light wind, and within a moderate temperature range (for example, 10 to 25 degrees Celsius).

Retrieval procedure determination unit 105, for example, upon detecting specific weather conditions three hours hence, determines a retrieval procedure, with a time period three hours hence designated as a retrieval time. Alternatively, retrieval procedure determination unit 105, upon detecting specific weather from 15:00 to 17:00, determines a retrieval procedure in which a time period from 15:00 to 17:00 is designated as a retrieval time. Alternatively, retrieval procedure determination unit 105, upon detecting that current weather is specific weather, determines a retrieval procedure in which a time period starting from a present time is designated as a retrieval time.

Instead of a single time period (for example, a present time), any number of time periods (for example, a time period after an hour and a time period after two hours) for retrieving the drone 20 may be identified. Retrieval procedure determination unit 105 may determine one of retrieval procedures that differ in retrieval time, based on a situation (in the present embodiment, weather) indicated by situation information.

It is of note that specific weather for retrieval performed by a retrieval staff member may include a wider range of weathers (for example, rain, snow, or high or low temperatures) in contrast to those for suitable for retrieval with use of retrieval drone 30. Weather that is particularly inclement is unsuitable for retrieval, such as storm conditions and the presence of heavy rain, or lightning, and is excluded. Retrieval procedure determination unit 105 generates retrieval procedure information that indicates the determined retrieval procedure. The retrieval procedure information indicates a retriever, a retrieval time, a landing site, and a return site.

Retrieval procedure determination unit 105 is provided with a flight plan from flight plan acquisition unit 101, as described above. Retrieval procedure determination unit 105 generates retrieval procedure information indicating, as a return site, a destination site or a departure site as indicated in a flight plan for the drone 20 for which detection related to cessation of flight has been performed. After generating the retrieval procedure information, retrieval procedure determination unit 105 provides the retrieval procedure information to retrieval processing unit 106. Retrieval processing unit 106 performs processing for execution of a retrieval procedure determined by retrieval procedure determination unit 105. Retrieval processing unit 106 is an example of a "processing unit" according to the present invention.

Retrieval processing unit 106, for example, upon receiving retrieval procedure information in which a retrieval staff member is designated as a retriever, sends notification data to an address (for example, an email address) of the retrieval staff member to inform him/her of a retrieval time, a landing site, and a return site indicated by the retrieval procedure information. The retrieval member upon being alerted to the notification data, for example, on his/her smartphone, proceeds to a notified landing site at a notified retrieval time to retrieve the drone 20 that has ceased flight flying, and brings the drone 20 to a notified return site.

Alternatively, upon receiving retrieval procedure information in which retrieval drone 30 is designated as a retriever, sends notification data to retrieval drone 30 to notify retrieval drone 30 of a retrieval time, a landing site, and a return site as indicated by the retrieval procedure information. Retrieval drone 30, upon receipt of the notification data, provides the notification data to flight control unit 301. Each of flight control unit 301, flight unit 302, and sensor measurement unit 303 of retrieval drone 30 has the same function as a unit having the same name of drone 20. The three units function in cooperation to enable retrieval drone 30 to reach a notified landing site at a notified retrieval time.

When retrieval drone 30 arrives at the landing site, flight control unit 301 provides a notification of arrival to image capture unit 304. Upon receipt of the notification, image capture unit 304 captures an image of a surrounding area for provision to each of flight control unit 301 and status determination unit 305. Status determination unit 305 is also provided with altitude information from sensor measurement unit 303. Status determination unit 305 determines a state of the drone 20 based on the image captured by image capture unit 304.

Status determination unit 305 recognizes the drone 20, for example, by use of a pattern matching technique, and determines whether the drone 20 is upright or on its side. In addition, status determination unit 305 calculates, based on a size and a position of the drone 20 shown in the image, a distance between retrieval drone 30 and the drone 20, and a direction from which the drone 20 is viewed by retrieval drone 30. Upon calculating the distance and the direction, status determination unit 305 calculates an altitude of the drone 20 based on the distance and the direction.

When status determination unit 305 determines that the drone 20 is upright, the unit determines that the drone 20 has successfully landed. When status determination unit 305 determines that the drone 20 is on its side, and also determines that an altitude is zero meter (namely, the drone is on the ground), the unit determines that the drone 20 is lying on the ground. When status determination unit 305 determines that the drone 20 is on its side, and also determines that an altitude is higher than zero meter, the unit determines that the drone 20 is snagged in a tree or in a bush. Status determination unit 305 provides a result of the determination to flight control unit 301, hold control unit 306, and retrieval unavailability notification unit 307.

Flight control unit 301 and hold control unit 306, upon receiving a notification that the drone 20 is upright or on its side, performs an operation to retrieve the drone 20. Specifically, flight control unit 301 causes retrieval drone 30 to descend from above the drone 20 and to land over it, based on the captured image. Hold control unit 306 controls holding device 28 and landing legs 392 such that retrieval drone 30 holds the drone 20.

A length in a vertical direction of the drone 20 changes depending on whether the drone is upright or on its side. Hold control unit 306, before landing, changes a length of landing legs 392 in accordance with a state of the drone 20. Hold control unit 306 holds arms 381 open before landing and closes arms 381 after landing, so that the drone 20 is caught and held by arms 381.

After arms 381 are closed, flight control unit 301 causes retrieval drone 30 to take off. In addition, flight control unit 301 determines whether retrieval drone 30 holds the drone 20 based on a speed measured by sensor measurement unit 303. Flight control unit 301 determines that retrieval drone 30 holds the drone 20, upon detecting that the speed is slower than that measured when retrieval drone 30 alone takes off. When flight control unit 301 determines that retrieval drone 30 does not hold the drone 20, the units perform an operation to hold the drone 20 again. On the other hand, when flight control unit 301 determines that retrieval drone 30 holds the drone 20, the unit causes retrieval drone 30 to fly to a notified return site.

Retrieval unavailability notification unit 307, when it is determined that the drone 20 for which detection related to cessation of flight has been performed is snagged in a bush or on a tree, sends notification data to server device 10 to notify that the drone 20 cannot be retrieved. Upon receiving the notification data, retrieval procedure determination unit 105 generates retrieval procedure information in which a retrieval staff member is designated as a retriever, so that the retrieval staff member is sent to retrieve the drone 20 that cannot be retrieved by retrieval drone 30.

The foregoing devices of drone management system 1 perform a retrieval process for retrieval drone 20 that has ceased flight at an expected site.

Figure 7:
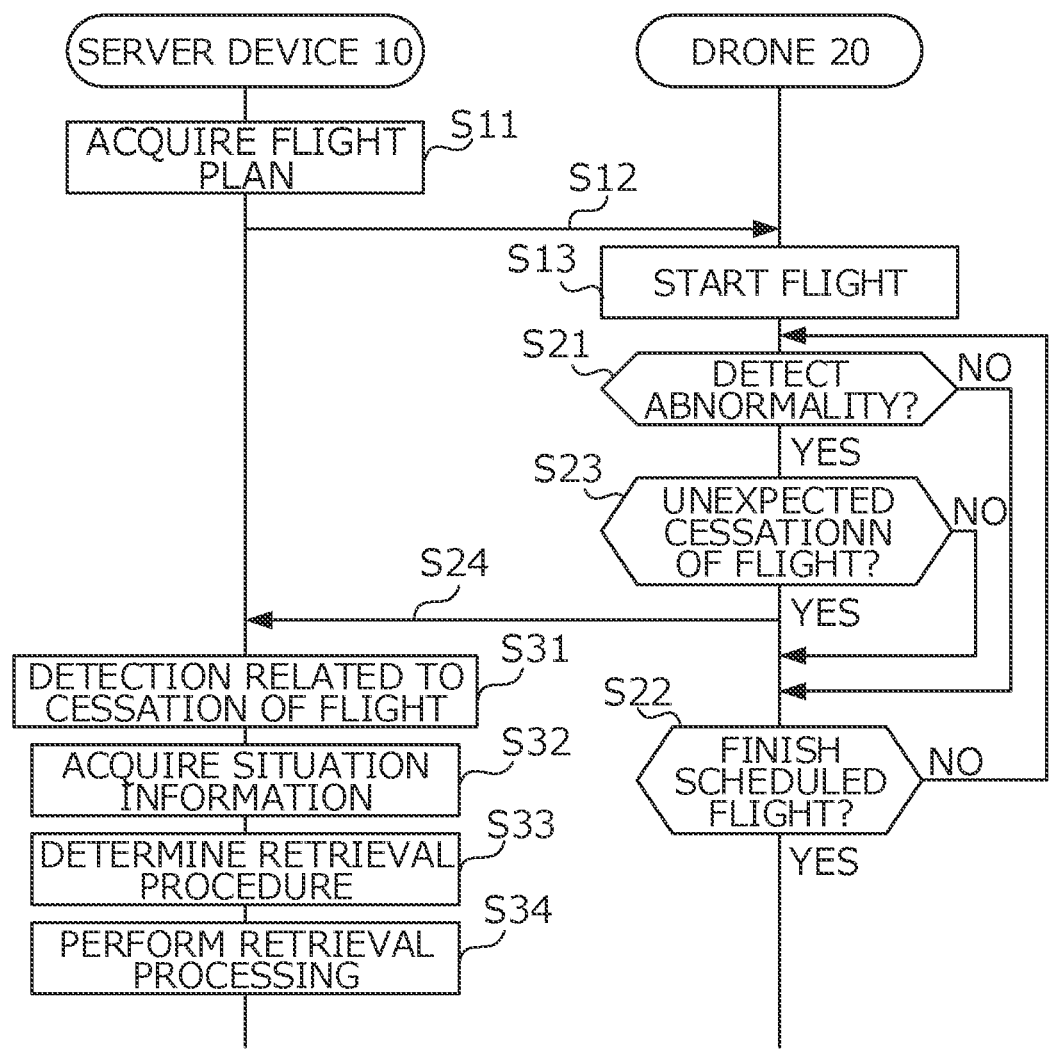
FIG. 7 is a diagram showing an example of a procedure of operations performed by each device in a retrieval process, of the present invention.

FIG. 7 shows an example of a procedure of operations performed by each device in the retrieval process. In the example shown, it is assumed that cessation of flight is detected. This procedure starts, for example, when the business operator of drone 20 sends a flight plan. Server device 10 (flight plan acquisition unit 101) acquires the flight plan of drone 20 (step S11).

Subsequently, server device 10 (flight instruction unit 102) sends instruction data to the drone 20 based on the acquired flight plan to instruct the drone 20 to fly (step S12). The drone 20 (flight control unit 201 and flight unit 202) starts flying based on instructions indicated by the instruction data (step S13). Subsequently, the drone 20 (abnormality detection unit 204) determines whether the drone 20 has detected an abnormality such as abnormal temperature, an abnormal vibration, a disconnection, or a water leakage (step S21).

When determining at step S21 that the drone 20 has not detected an abnormality (NO), the drone 20 determines whether it has finished a scheduled flight (step S22). When determining that the drone 20 has finished the scheduled flight (YES), the present procedure ends. On the other hand, when determining that the drone 20 has not finished the scheduled flight (NO), the drone 20 returns to step S21. When determining at step S21 that the drone 20 has detected an abnormality (YES), the drone 20 (flight cessation determination unit 205) determines whether to cease its flight (step S23).

When determining at step S23 that the drone 20 should not cease its flight (NO), the drone 20 performs step S22 (determination as to the end of the flight). On the other hand, when determining at step S23 that the drone 20 should cease its flight (YES), the drone 20 sends emergency landing information indicating an emergency landing location to server device 10 (step S24). Upon receiving the emergency landing information, server device 10 (flight cessation detection unit 103) performs detection related to cessation of flight at an unexpected location (step S31).

Subsequently, server device 10 (situation information acquisition unit 104) acquires situation information (in the present embodiment, weather-related information) indicating a situation related to retrieval of the drone 20 for which the detection related to cessation of flight has been performed (step S32). Subsequently, server device 10 (retrieval procedure determination unit 105) determines a retrieval procedure for the drone 20 for which the detection related to cessation of flight has been performed, based on the situation indicated by the situation information (step S33). Subsequently, server device 10 (retrieval processing unit 106) performs retrieval processing for executing the retrieval procedure (step S34).

As described in the foregoing, in the present embodiment, a retrieval procedure is determined based on weather-related information. In the case of retrieval performed by retrieval drone 30, retrieval is performed in weather suitable for flight of a drone, and retrieval is not performed in weather unsuitable for flight of a drone. In the case of retrieval performed by a retrieval staff member, retrieval is not performed in unsuitable weather such as storm conditions, heavy rain, or lightning, and rather retrieval is performed in suitable weather. In short, the present embodiment makes it possible to retrieve drone 20 that has ceased flight, using a procedure calibrated to a situation (in the present embodiment, weather conditions).

[2] Modifications

The above embodiment is merely one example of an embodiment of the present invention. The above embodiment may be modified as described below.

[2-1] Retrieval Method

In the above embodiment, methods for retrieval drone 20 that has ceased flight include manual retrieval performed by a retrieval staff member who utilizes any appropriate transport route, and unmanned retrieval performed by retrieval drone 30 that utilizes a flight route. However, retrieval methods are not limited to those stated thus far. For example, an autonomous vehicle or boat equipped with a robotic arm may be used for retrieval. In other words, unmanned retrieval may be performed by utilizing any appropriate transport route such as a land route, a flight route, or a water route.

[2-2] Plural Retrieval Procedures

In the above embodiment, one of retrieval procedures that differ in retrieval time is determined. In the determination process, the retrieval procedures that differ in retrieval time may refer to retrieval procedures that differ in a retrieval time taken dependent on a priority of retrieval, ranging from a request for urgent retrieval, a request for retrieval within a same day, and a request for retrieval on a next day.

Alternatively, the retrieval procedures may be replaced with retrieval procedures that differ relative to the retriever (a retrieval staff member or retrieval drone 30). Retrieval procedures that differ relative to the retriever are predetermined in a case where predetermined retrievers such as a retrieval staff member of retrieval drone 30 are able to retrieve drone 20. In a situation where probable cessation of flight is detected, the drone 20 may be able to continue to fly in a controlled state for long enough to identify and utilize a safe landing site.

When drone 20 is able to maintain controlled flight for a certain length of time, retrieval procedures may be prepared with different potential landing sites identified and designated for drone 20. The retrieval procedures are determined based on information such as position information of drone 20. Retrieval procedure determination unit 105 determines one of retrieval procedures based on situation information acquired by situation information acquisition unit 104. Specific methods of making the determination will be described in the following descriptions of modifications.

[2-3] Procedure Taking Possible Damage into Consideration

Drone 20 needs to reduce its speed to stop safely; however, if an abnormality in speed control exists, the drone 20 may make a crash landing in which the drone 20 or an object transported by the drone 20 may be damaged. In the present modification, a set of drone 20 and a transported object or drone 20 alone, which is a retrieval target, is retrieved using a retrieval procedure in which possible damage is taken into consideration.

Figure 8:
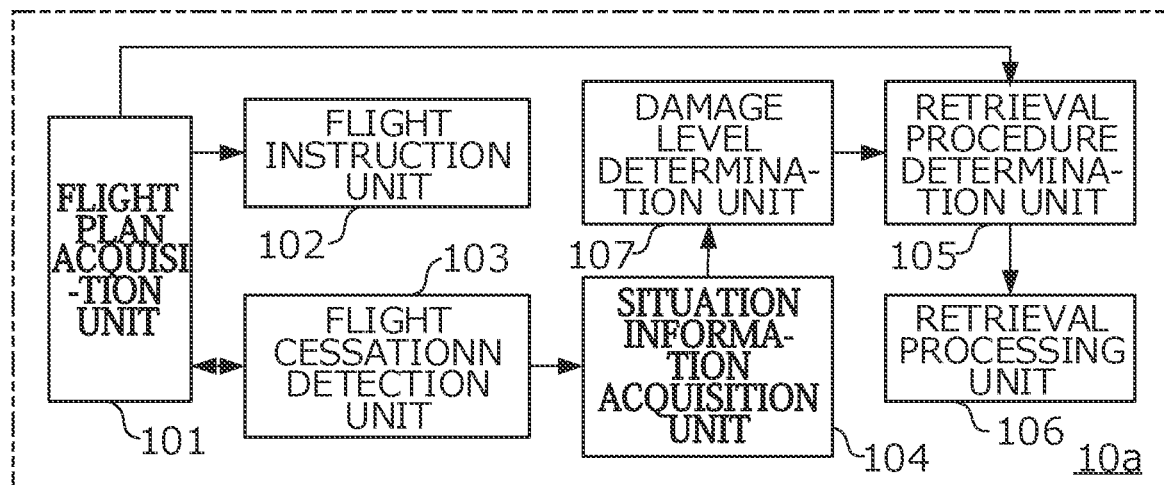
FIG. 8 is a diagram showing a functional configuration according to a modification of the present invention.

FIG. 8 shows a functional configuration according to the present modification. FIG. 8 shows server device 10a including damage level determination unit 107 in addition to the units shown in FIG. 6. In the present modification, situation information acquisition unit 104, upon detection related to cessation of flight of drone 20, acquires, as situation information, information (damage level information) indicating a level of damage that will be caused to a retrieval target when the drone 20 ceases flight. For example, situation information acquisition unit 104 acquires speed information indicating a flight speed measured immediately before the drone 20 ceases flight, as damage level information.

The phrase "speed information" as used herein refers to speed information measured at predetermined time intervals, and that precedes speed information indicating a final speed "0." If a measurement interval is excessively short, instead of flight speed, a vibration amount of downed drone 20 may be measured. Thus, situation information acquisition unit 104 may be caused to acquire speed information measured at a predetermined time (for example, one to three seconds) before a speed of drone 20 becomes zero. Alternatively, drone 20 may be provided with a damage detection sensor for measurement and indication of a damage level caused to the drone 20.

Thus, situation information acquisition unit 104 acquires an output value of the damage detection sensor as damage level information. The damage detection sensor is, for example, a strain sensor provided at chassis 291 for detecting a strain of chassis 291, a weight sensor provided at landing legs 292 for detecting a decrease in weight (in other words, detachment by damage of a part of drone 20), or an earth leakage sensor provided around a circuit for detecting breakage of an insulator.

Alternatively, situation information acquisition unit 104 may acquire as damage level information, information indicative of a presence or absence of emergency landing information sent from drone 20. A presence of emergency landing information is indicative that drone 20 will be able to make a controlled landing, and thus is likely to suffer little or no damage. On the other hand, an absence of emergency landing information is indicative that drone 20 will be unable to make a controlled landing, and is thus likely to suffer substantial damage. Situation information acquisition unit 104 provides the acquired damage level information to damage level determination unit 107.

Damage level determination unit 107 determines whether a level of damage caused to the retrieval target (a set of drone 20 and a transported object, or drone 20 alone) is equal to or higher than a predetermined reference level based on the provided damage level information. Damage level determination unit 107 makes the determination by use of a damage level table in which damage levels are associated with references. FIG. 9 shows an example of the damage level table. FIG. 9(*a*) shows that when a speed of drone 20 measured immediately before the drone 20 ceases flying is smaller than threshold Th1, a damage level for the drone 20 is smaller than a reference level, and that when the speed is equal to or greater than threshold Th1, a damage level for the drone 20 is equal to or greater than the reference level.

FIG. 9(*b*) shows that when an amount of distortion of the chassis of drone 20 is smaller than threshold Th2, a damage level for the drone 20 is smaller than the reference level, and that when the amount of distortion of the chassis is equal to or greater than threshold Th2, a damage level for the drone 20 is equal to or greater than the reference level. FIG. 9(*c*) shows that when a change in weight of drone 20 is less than threshold Th3, a damage level of the drone 20 is less than the reference level, and that when the change in weight is equal to or greater than threshold Th3, a damage level of the drone 20 is equal to or greater than the reference level. FIG. 9(*d*) shows that when a current leak of drone 20 is less than threshold Th4, a damage level for the drone 20 is less than the reference level, and when a current leak of is equal to or greater than threshold Th4, a damage level of the drone 20 is equal to or greater than the reference level.

FIG. 9(*e*) shows that the presence of emergency landing information is indicative that a damage level is less than the reference level, and that the absence of emergency landing information is indicative that a damage level is equal to or greater than the reference level. Damage level determination unit 107, upon detecting that provided damage level information is indicative of a value (such as flight speed) associated with a category "smaller than threshold" in the damage level table, determines that a damage level is smaller than the reference level. On the other hand, upon detecting the value is associated with a category "equal to or greater than threshold," damage level determination unit 107 determines that a damage level is equal to or greater than the reference level. It is of note that damage level determination unit 107 may make the determination by use of the thresholds (such as threshold Th1) prestored therein, instead of the damage level table.

Damage level determination unit 107 provides a result of the determination to retrieval procedure determination unit 105. Retrieval procedure determination unit 105 determines a retrieval procedure based on the result of the determination, which is indicative of whether a level of damage indicated by situation information acquired by situation information acquisition unit 104 is equal to or greater than the predetermined reference level. The predetermined reference level herein refers to, for example, a level of damage so large that a part of a retrieval target becomes detached. A damage level being equal to or higher than the reference level indicates a high possibility that a part of a retrieval target has become detached. The reference level is predetermined through experiments or simulations.

Retrieval procedure determination unit 105, upon detecting a determination that a damage level is smaller than the reference level, determines a procedure in which a retrieval target is retrieved using an aerial vehicle (such as retrieval drone 30) capable of transporting the retrieval target. On the other hand, upon detecting that the damage level is equal to or greater than the reference level, retrieval procedure determination unit 105 determines a procedure in which the retrieval target is retrieved using a means other than the aerial vehicle. The retrieval procedure in which a means other than the aerial vehicle is used refers to a manual retrieval procedure in which retrieval is performed by, for example, a retrieval staff member, or an unmanned retrieval procedure (non-flight-route retrieval procedure) in which retrieval is performed by an unmanned autonomous vehicle or boat by use of a transportation route other than a flight route.

The retrieval procedure in which retrieval is performed using retrieval drone 30 refers to a retrieval procedure (flight-route retrieval procedure) in which a flight route is used as a transportation route. The manual retrieval procedure, the flight-route retrieval procedure, and the non-flight-route retrieval procedure correspond to "plural retrieval procedures" according to the present modification. Retrieval procedure determination unit 105 determines one of the retrieval procedures based on acquired situation information, as described above.

If an unmanned device such as retrieval drone 30 is used to retrieve a retrieval target having a high damage level, the unmanned device may fail to retrieve a part that has become detached from the retrieval target. In contrast, if manual retrieval is performed to retrieve a retrieval target having a high damage level, which retrieval method makes it possible to retrieve and carry a retrieval target in a flexible way (for example, the retrieval method makes it possible to retrieve scattered parts of the retrieval target), a situation is prevented in which a part that has become detached from the retrieval target is left behind.

If an aerial vehicle such as retrieval drone 30 is used to transport a damaged retrieval target, the aerial vehicle may drop a part of the retrieval target during flight and harm a person or object on the ground. In contrast, if a transportation route other than a flight route (such as a ground travel route or a water route) is used to transport a retrieval target, a possibility is reduced that a part that has become detached from the retrieval target may harm a person or object on the ground.

[2-4] Procedure Taking Weigh into Consideration

It is possible that a total weight of drone 20 and an object held by the drone 20 may exceed a maximum load capacity of retrieval drone 30 (a maximum weight of a load that can be transported by retrieval drone 30 by air). It is also possible that if drone 20 is a large drone, a weight of the drone 20 alone may exceed the maximum load capacity. In view of these potential problems, in the present modification, a retrieval target is retrieved using a retrieval procedure that takes a weight of the retrieval target into consideration.

In the present modification, situation information acquisition unit 104 acquires, as situation information, information (weight information) indicating a weight of a retrieval target including drone 20 for which detection related to cessation of flight has been performed. If a flight plan includes information on a weight each of drone 20 and a transported object, situation information acquisition unit 104, for example, acquires the flight plan as situation information. In a case where drone 20 carries plural objects and delivers them one by one, situation information acquisition unit 104 may acquire, as situation information, a flight plan (information on an hourly weight of the objects) including information on a weight each of the objects and on an expected delivery time for each of the objects.

Alternatively, drone 20 may be equipped with a sensor for measuring a weight of a transported object, and situation information acquisition unit 104 may acquire a measured weight of the transported object from the drone 20 as situation information. In that case, information on a weight of the drone 20 may be pre-stored in server device 10, and situation information acquisition unit 104 may acquire the weight information as situation information.

Alternatively, situation information acquisition unit 104 may acquire a flight plan including a product name of the drone 20, and acquire weight information of the product, for example, via the Internet.

Situation information acquisition unit 104 provides the acquired weight information to retrieval procedure determination unit 105. Retrieval procedure determination unit 105 determines a retrieval procedure based on the provided weight information, which is situation information acquired by situation information acquisition unit 104. Specifically, upon detecting that a weight indicated by the acquired situation information (weight information) is smaller than a threshold value, retrieval procedure determination unit 105 determines a procedure in which retrieval (flight-route retrieval) is performed using retrieval drone 30 (an aerial vehicle capable of transporting a retrieval target).

The threshold value herein refers to a weight equal to or smaller than a maximum loading weight for the aerial vehicle capable of transporting a retrieval target. Retrieval procedure determination unit 105, upon detecting that the weight indicated by the situation information is equal to or greater than the threshold value, determines a procedure in which retrieval (the manual retrieval or the non-flight-route retrieval) is performed by a means other than retrieval drone 30. This determination can reduce a possibility that an aerial vehicle used to hold and transport an object may crash or break down, compared to a determination of a retrieval procedure performed without regard to weight information.

Retrieval procedure determination unit 105 determines one of retrieval procedures including the manual retrieval procedure, the flight-route retrieval procedure, and the non-flight-route retrieval procedure, based on situation information, as described above. It is of note that if drone 20 is in a condition to unload a transported object, the drone 20 may be caused to unload the transported object to reduce its weight so that the drone 20 can be transported by an aerial vehicle. In that case, a procedure for unloading the transported object is included in the retrieval procedures.

In that case, after drone 20 ceases its flight, flight cessation determination unit 205 of the drone 20 determines whether holding device 28 is in a condition to operate properly. Upon determining that holding device 28 is in a condition to operate properly, flight cessation determination unit 205 causes arms 281 shown in FIG. 4 to be opened to unload a transported object, and notifies server device 10 of the unloading. Upon receiving the notification, situation information acquisition unit 104 acquires, as situation information, weight information indicative of a weight of the drone 20 for which detection related to cessation of flight has been performed and a weight of the object transported by the drone 20.

To acquire the weight information, the above-described method for acquiring weight information for a retrieval target may be used. Situation information acquisition unit 104, in a case where there are plural transported objects, acquires weight information for each of the plural transported objects. Retrieval procedure determination unit 105, upon determining based on acquired situation information (weight information) that a weight of drone 20 and a weight each of transported objects are smaller than the threshold value, determines a procedure in which retrieval is performed using a number of aerial vehicles (for example, plural retrieval drones 30) that can transport the retrieval targets.

For example, upon determining that both a weight each of drone 20 and a transported object is smaller than the threshold value, retrieval procedure determination unit 105 determines a procedure in which they are retrieved by two retrieval drones 30. In that case, retrieval procedure determination unit 105 may determine a procedure in which the transported object is retrieved and transported to a destination site, instead of a retrieval center.

Retrieval procedure determination unit 105, upon determining that any one of a weight of drone 20 and a weight each of a transported object(s) is equal to or greater than the threshold value, determines a procedure in which retrieval is performed using a means other than retrieval drone 30. Having a retrieval staff member perform retrieval incurs staff costs. If costs for flying multiple retrieval drones 30 is lower than the staff costs, the above determination performed by retrieval procedure determination unit 105 can reduce costs of retrieval as compared to determination of a retrieval procedure without unloading of a transported object.

It is of note that drone 20 may notify server device 10 that it can unload a transported object, before it notifies server device 10 that it has unloaded the transported object. In that case, retrieval procedure determination unit 105 determines one of retrieval procedures including a retrieval procedure in which the drone 20 is caused to unload the transported object. Retrieval processing unit 106 sends instruction data to the drone 20 to instruct the drone 20 to unload the transported object. Upon receiving the instruction data, the drone 20 unloads the transported object.

[2-5] Procedure Taking Presence or Absence of Transported Object into Consideration Whether drone 20 that has stopped flying holds an object to be transported may determine a retrieval procedure to be used. In the present modification, situation information acquisition unit 104 acquires, as situation information, information (transportation status information) indicating whether drone 20, for which detection related to cessation of flight has been performed, holds an object to be transported. For example, situation information acquisition unit 104 acquires, as situation information, a flight plan including information on a transportation status or a transportation destination. Situation information acquisition unit 104 provides the acquired transportation status information to retrieval procedure determination unit 105.

Retrieval procedure determination unit 105 determines a retrieval procedure based on the provided transportation status information, which is situation information acquired by situation information acquisition unit 104. Specifically, upon detecting that the acquired situation information (transportation status information) is indicative that drone 20 holds no object to be transported, retrieval procedure determination unit 105 determines a procedure in which retrieval (flight-route retrieval) is performed using retrieval drone 30. In the present modification, retrieval drone 30 refers to another aerial vehicle that can transport at least the drone 20 for which detection related to cessation of flight has been performed.

A maximum loading weight of retrieval drone 30 may be smaller than a total weight of the drone 20 and its transported object as long as the maximum loading weight is greater than a weight of the drone 20. Retrieval procedure determination unit 105, upon detecting that the situation information is indicative that the drone 20 holds an object to be transported, determines a procedure in which retrieval (the manual retrieval or the non-flight-route retrieval) is performed using a means other than retrieval drone 30. Retrieval procedure determination unit 105 determines one of retrieval procedures including the manual retrieval procedure, the flight-route retrieval procedure, and the non-flight-route retrieval procedure, based on situation information, as described above.

When retrieval is performed using an aerial vehicle, there is a risk that the aerial vehicle may crash due to an unexpected event. If the aerial vehicle crashes, its transported object may be damaged and cannot be delivered to a destination. In the present modification, an aerial vehicle with a transported object attached can be retrieved through a non-flight route so that the transported object can be securely delivered to a destination. In addition, manually retrieving an aerial vehicle with a transported object attached enables handling of the transported object that an unmanned vehicle cannot perform, such as repair of a damaged package.

[2-6] Procedure Taking Attribute of Transported Object into Consideration

After drone 20 ceases its flight, a retrieval procedure may be determined based on an attribute of an object transported by the drone 20. In the present embodiment, situation information acquisition unit 104, upon detecting that drone 20 for which detection related to cessation of flight has been performed holds an object to be transported, acquires information (attribute information) indicating an attribute of the object, as situation information. For example, situation information acquisition unit 104 acquires price information for the object as attribute information indicating a value of the object.

In the present modification, it is assumed that a flight plan includes information on a name of a transported object. Situation information acquisition unit 104 acquires a name of a transported object indicated by a flight plan, and acquires, as attribute information, a price of a product having the acquired name, for example, via the Internet. In addition, situation information acquisition unit 104 acquires attribute information indicative of whether a transported object deteriorates with time. For example, upon detecting that a flight plan includes information indicative of whether a transported object is a frozen product or fresh food, situation information acquisition unit 104 acquires the information as attribute information. Situation information acquisition unit 104 provides the acquired attribute information to retrieval procedure determination unit 105.

Retrieval procedure determination unit 105 determines a retrieval procedure for a retrieval target (drone 20 for which detection related to cessation of flight has been performed and a transported object) based on the provided attribute information, which is situation information acquired by situation information acquisition unit 104. Specifically, upon detecting that the acquired situation information (attribute information) indicates a predetermined attribute, retrieval procedure determination unit 105 determines a procedure in which retrieval is performed using retrieval drone 30. On the other hand, upon detecting that the situation information does not indicate the predetermined attribute, retrieval procedure determination unit 105 determines a procedure in which retrieval is performed using a means other than retrieval drone 30.

For example, upon detecting that a price of a transported object is smaller than a predetermined amount of money (a predetermined attribute), retrieval procedure determination unit 105 determines a retrieval procedure in which retrieval drone 30 is used. On the other hand, upon detecting that the price of the transported object is equal to or greater than the predetermined amount of money, retrieval procedure determination unit 105 determines a retrieval procedure in which a means other than retrieval drone 30 is used. Retrieval procedure determination unit 105 determines one of retrieval procedures including the manual retrieval procedure, the flight-route retrieval procedure, and the non-flight-route retrieval procedure, based on situation information, as described above.

When an object is transported using an aerial vehicle such as retrieval drone 30, there is a risk that the object may be badly damaged due to an impact of a crash, compared to other transportation methods. In view of this, it is avoided that an expensive object is transported by retrieval drone 30. With this precaution, should retrieval drone 30 crash due to an abnormality, the crash does not generate high costs in compensation.

Retrieval procedure determination unit 105, upon detecting that a transported object is a frozen product or fresh food, determines a retrieval procedure in which retrieval drone 30 is used, and upon detecting that the transported object is not a frozen product or fresh food, determines a retrieval procedure in which a means other than retrieval drone 30 is used. Movement to a landing site of drone 20 is likely to take fewer hours with retrieval drone 30 that travels a flight route than with other means such as a retrieval staff member or an unmanned vehicle that travels a non-flight route. By having retrieval drone 30 retrieve an object that is a frozen product or fresh food, it is avoided that the object deteriorates before it is retrieved, compared to using another means to retrieve the object.

[2-7] Procedure Taking Whether Object can be Unloaded into Consideration

After drone 20 ceases its flight, a retrieval procedure may be determined based on whether drone 20 can unload an object to be transported. In the present embodiment, situation information acquisition unit 104, after detection related to cessation of flight is performed for drone 20 that holds and transports an object, acquires, as situation information, information (unloading function information) indicating whether the drone 20 has an unloading function for automatically unloading the object.

The unloading function herein refers to, for example, a function for causing arms 281 shown in FIG. 4 to be opened so that an object is unloaded. Arms 281 may be automatically caused to hold an object; however, in the present modification, such a holding function may not be provided. Alternatively, drone 20 may have, as the unloading function, a function for automatically unloading a net or container including an object. The net or container is manually attached to the drone 20 before the drone 20 flies.

Situation information acquisition unit 104, for example, inquires of a system of an operator who operates and manages drone 20 for which detection related to cessation of flight has been performed, as to whether the drone 20 has the unloading function. Situation information acquisition unit 104 acquires unloading function information sent in response to the inquiry, as situation information. Alternatively, situation information acquisition unit 104 may acquire situation information by acquiring a flight plan including unloading function information. Situation information acquisition unit 104 provides the acquired unloading function information to retrieval procedure determination unit 105.

Retrieval procedure determination unit 105 determines a retrieval procedure based on the provided unloading function information, which is situation information acquired by situation information acquisition unit 104. Specifically, upon detecting that the acquired situation information is indicative that drone 20 has the unloading function, retrieval procedure determination unit 105 determines a procedure in which a transported object is unloaded using the unloading function and a procedure in which the unloaded transported object is retrieved using, for example, retrieval drone 30.

Retrieval procedure determination unit 105 further determines a retrieval procedure performed after drone 20 for which detection related to cessation of flight has been performed unloads a transported object, in which the drone 20 is caused to move to a position away from the transported object so as not to hinder retrieval of the transported object. Retrieval procedure determination unit 105, as for drone 20 for which detection related to cessation of flight has been performed, may determine a procedure in which retrieval is performed using another (second) retrieval drone 30, or a procedure in which retrieval (the manual retrieval or the non-flight-route retrieval) is performed using a means other than retrieval drone 30.

When another retrieval drone 30 is caused to perform retrieval, retrieval procedure determination unit 105 determines a procedure in which retrieval drone 30 that can arrive at a landing site first is caused to retrieve an unloaded transported object. Retrieval procedure determination unit 105, as for a transported object, may determine a procedure in which the transported object is transported to a retrieval center, or a procedure in which the transported object is retrieved and transported to a destination. In either case, a transported object can be retrieved and delivered to a destination earlier than in a case where retrieval is performed using another retrieval procedure.

Retrieval procedure determination unit 105 determines some of retrieval procedures including the manual retrieval procedure, the flight-route retrieval procedure, the non-flight-route retrieval procedure, the procedure for unloading a transported object, and the procedure for causing drone 20 to move to a position away from a transported object, based on situation information, as described above. It is of note that retrieval procedure determination unit 105 may determine a procedure in which an unloaded transported object is retrieved using a drone that is not capable of retrieval drone 20 but has an automatic holding function for automatically holding and transporting the transported object.

The drone having the automatic holding function herein refers to, for example, drone 20 including arms 281 shown in FIG. 4. The drone 20, in a situation where an unloaded transported object is on the ground, lands over the transported object such that arms 281 surround the transported object. The drone 20 adjusts a length of landing legs 292 such the tips of arms 281 reach the ground, and then closes arms 281 so that the tips of arms 281 enter a gap between the ground and the transported object. The foregoing is how the drone 20 automatically holds the transported object.

It is of note that the above is merely an example of the automatic holding function. In another example, given that the transported object is included in a net, the drone may be provided with an arm or rope having a claw, which is used to hook the net to hold the transported object automatically. Alternatively, the drone and a container including a transported object may be provided with a connecter for connecting the drone and the container. The drone automatically holds the container (the transported object) by engaging a connector of the drone with a connector of the container.

The connectors enable the drone to lock or release connection of the connectors. The drone 20 that holds a transported object by use of the connectors, when having ceased its flight due to an expected event, releases connection by the connectors to unload the transported object. In general, there are more drones capable of transporting only a transported object than drones capable of transporting drone 20 with the transported object attached, because the transported object alone is lighter, and is shaped and made of a material such that the transported object can be held easily.

By causing drone 20 to unload a transported object, more drones can be used to retrieve the transported object so that the transported object can be delivered earlier than in a case where the drone 20 is not caused to unload the transported object. It is of note that retrieval procedure determination unit 105 may determine a retrieval procedure in which a transported object is not always unloaded but is loaded only when it is determined that the transported object can be transported. For example, situation information acquisition unit 104 acquires damage level information in addition to unloading function information.

In that case, damage level determination unit 107 shown in FIG. 8 determines whether a damage level for a retrieval target is equal to or higher than the predetermined reference level. When it is determined that the damage level is equal to or higher than the reference level, retrieval procedure determination unit 105 determines a procedure in which a transported object is unloaded using the unloading function. On the other hand, when it is determined that the damage level is not equal to or higher than the reference level, retrieval procedure determination unit 105 determines a procedure in which the transported object is not unloaded, and a retrieval target is retrieved using an aerial vehicle (for example, retrieval drone 30) capable of transporting the retrieval target, or a means other than the aerial vehicle. The determinations make it possible that delivery of the transported object is restarted early only in a case where the transported object cannot be easily damaged.

[2-8] Landing Site

A retrieval procedure in which a landing site for drone 20 is designated may be determined. In the present embodiment, when flight cessation detection unit 103 performs detection of probable cessation of flight (detection of a fact that drone 20 is expected to cease flying) as detection related to cessation of flight, situation information acquisition unit 104 acquires, as situation information, information indicating an attribute(s) of a site at which the drone 20 can land.

The site at which the drone 20 can land herein refers to, for example, a riverbed, a coast, a park, or a roof of a public building, which is approved by a local government. The attribute of the site at which the drone 20 can land herein refers to, for example, a size, an inclination relative to a horizontal direction, a number of people in the area, or an amount of traffic in the area. The attribute indicates either or both of a degree of safety of environment around drone 20 that has landed (a degree to which the drone 20 does not harm people or objects in the area) and a degree of safety of the drone 20 that has landed (a degree to which the drone 20 is not stolen or damaged).

For example, the degree of safety of environment and the degree of safety of drone 20 decrease in proportion to a number of people or an amount of traffic in an area. The degree of safety of drone 20 increases in proportion to a size of a site at which drone 20 can land, and decreases in proportion to an inclination relative to a horizontal direction. For example, situation information acquisition unit 104 pre-stores a landing site table in which location information of a site at which drone 20 can land is associated with attributes of the site.

FIG. 10 shows an example of the landing site table, in which a landing site "park alfa" is associated with location information "latitude xx, longitude yy," a population density "$N^{11}$ people/m$^2$" for weekday daytime, a population density "$N^{12}$ people/m$^2$" for weekday evening, and a population density "$N^{13}$ people/m$^2$" for all day on holidays. The landing site "park alfa" is also associated with a traffic amount "$N^{21}$ vehicles/m$^2$" for weekday daytime, a traffic amount "$N^{22}$ vehicles/m$^2$" for weekday evening, a traffic amount "$N^{23}$ vehicles/m$^2$" for all day on holidays, a size "area $A^{11}$," and an inclination "theta$^{11}$." The attributes are researched to be stored in the table.

It is of note that not all landing sites need to be associated with all attributes. For example, some landing sites may be associated with only population densities and traffic amounts, and other landing sites may be associated with only a size. A landing site is associated with at least one attribute. Situation information acquisition unit 104, upon receiving landing site information from flight cessation detection unit 103, acquires, as situation information, attributes (in a case where attributes are associated with a time zone, attributes associated with a time zone including a current time) of landing sites being within a predetermined distance from a position indicated by the landing site information.

Situation information acquisition unit 104 provides the acquired attribute information of landing sites to retrieval procedure determination unit 105. Retrieval procedure determination unit 105 determines a retrieval procedure based on the provided attribute information, which is situation information acquired by situation information acquisition unit 104. Specifically, retrieval procedure determination unit 105 determines a procedure in which drone 20 for which situation information indicating a predetermined attribute(s) has been acquired is caused to land at a site having the attribute(s). To make the determination, retrieval procedure determination unit 105 pre-stores, for example, an attribute table in which types of attribute are associated with predetermined attributes.

FIG. 11 shows an example of the attribute table, in which an attribute type "population density" is associated with a predetermined attribute "less than $N^1$ person/m$^2$." In addition, an attribute type "traffic amount" is associated with a predetermined attribute "less than $N^2$ vehicles/hour," an attribute type "area" is associated with a predetermined attribute "area $A^1$ or more," and an attribute type "slope" is associated with a predetermined attribute "less than theta$^1$." Retrieval procedure determination unit 105, upon detecting that a value(s) of an attribute(s) indicated by the acquired situation information is included in a range(s) of a predetermined attribute(s), determines a procedure in which drone 20 for which the attribute(s) has been acquired is caused to land at a landing site having the attribute(s).

For example, upon detecting that identified population density "$N^{11}$ people/m$^2$" is "less than $N^1$ people/m$^2$," retrieval procedure determination unit 105 determines a procedure in which drone 20 is caused to land at "park alfa." When receiving attribute information indicating plural attributes as in the case of attributes of "park alfa," retrieval procedure determination unit 105, upon detecting that at least one of the attributes is a predetermined attribute, may set a site having the at least one of the attributes as a landing site. Alternatively, upon detecting that two or more of the attributes are predetermined attributes, retrieval procedure determination unit 105 may set a site having the two or more attributes as a landing site.

When detecting two or more landing sites associated with a predetermined attribute(s), retrieval procedure determination unit 105 may randomly select one of them. Alternatively, retrieval procedure determination unit 105 may select one of them that is associated with a largest number of predetermined attributes. For example, in a case where a landing site "park alfa" is associated with a predetermined attribute of an attribute type "population density," and a landing site "park beta" is associated with predetermined attributes of attribute types "traffic amount" and "area," retrieval procedure determination unit 105 may select the landing site "park beta." Alternatively, retrieval procedure determination unit 105 may, for each of the landing sites, add up points pre-assigned to associated predetermined attributes, and select one of the landing sites for which a largest number of points has been calculated.

In either case, retrieval procedure determination unit 105 determines, based on situation information, one of retrieval procedures in which drone 20 is caused to land at different landing sites associated with different attributes, as described in the foregoing. The retrieval procedures herein refer to, for example, a procedure in which drone 20 is caused to land at "park alfa," and a procedure in which drone 20 is caused to land at "park beta."

Figure 12:
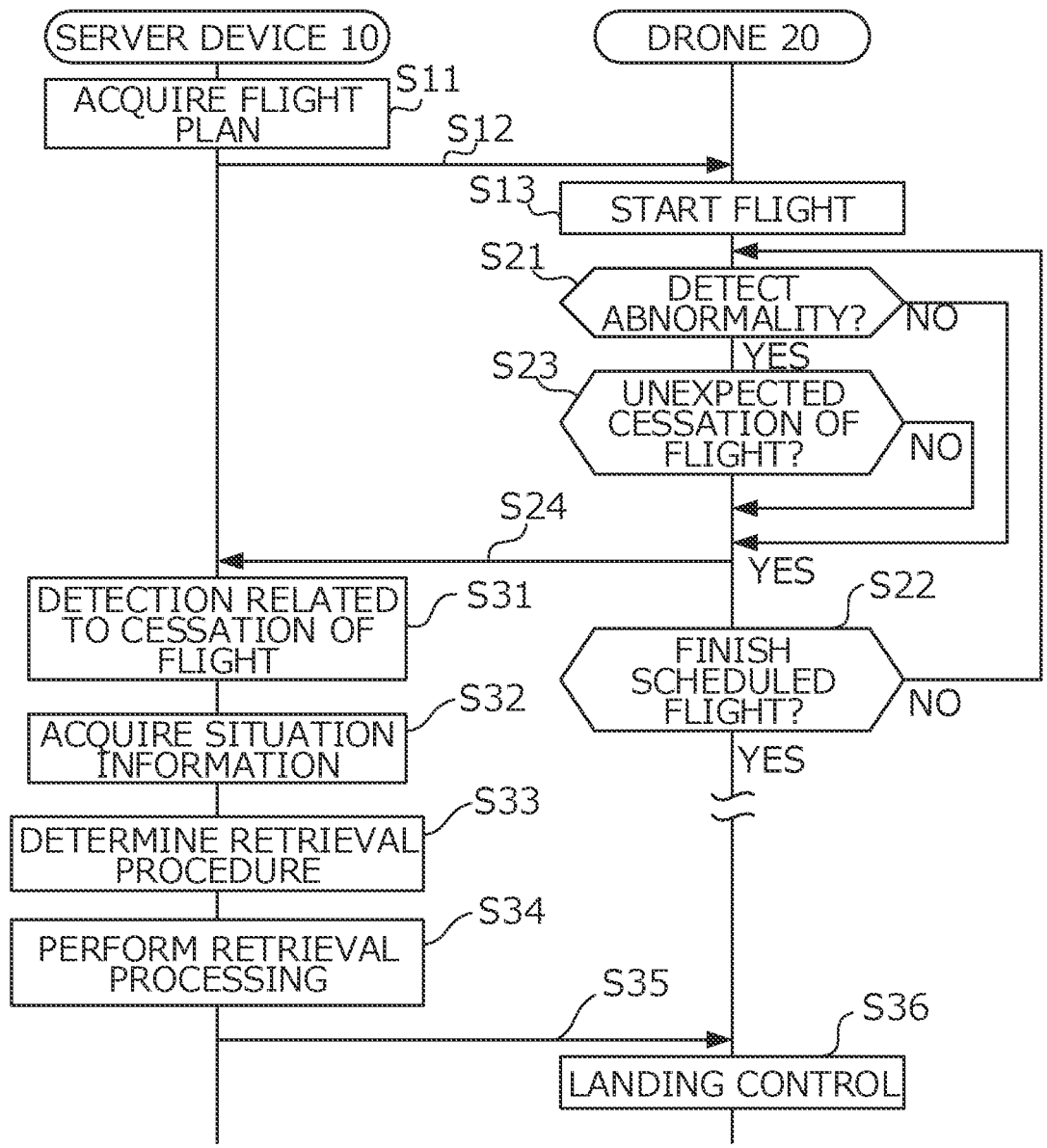
FIG. 12 is a diagram showing an example of a procedure of operations performed by each device in a retrieval process according to a modification of the present invention.

FIG. 12 shows an example of a procedure of operations performed by each device in a retrieval process according to the present modification. In the procedure shown, operations from step S11 for acquiring a flight plan to step S34 for performing retrieval processing are performed. It is of note that at step S24, emergency landing information is sent before drone 20 lands, and that at step S31, server device 10 (flight cessation detection unit 103) performs detection of probable cessation of flight as detection related to cessation of flight.

At step S32, server device 10 (situation information acquisition unit 104) acquires, as situation information, attribute information for drone 20 for which detection of probable cessation of flight has been performed. The acquired attribute information indicates an attribute(s) of sites at which the drone 20 can land. The sites are within a certain area including a current position of the drone 20. At step S33, server device 10 (retrieval procedure determination unit 105) determines a procedure in which the drone 20 for which situation information indicating a predetermined attribute(s) has been acquired is caused to land at a site having the predetermined attribute(s).

In step S34, server device 10 (retrieval processing unit 106) generates instruction data to instruct the drone 20 to land at the site having the predetermined attribute(s), as retrieval processing for executing the determined retrieval procedure. Subsequently, server device 10 (retrieval processing unit 106) sends the generated instruction data to the drone 20 (step S35). Upon receiving the instruction data, the drone 20 (flight control unit 201 and flight unit 202) lands at the site indicated by the instruction data (step S36).

In the present modification, a predetermined attribute(s) is set such that drone 20 is caused to land at a site having a higher degree of safety of environment and a higher degree of safety of the drone 20. By thus setting a predetermined attribute(s), the degrees of safety are increased for the drone 20 that is going to land, compared to a case where a landing site is selected regardless of its attribute(s).

[2-9] Aerial Vehicle

In the above embodiment where a rotary-wing aerial vehicle is used, another type of autonomous aerial vehicle may be used. For example, an airplane-type aerial vehicle or a helicopter-type aerial vehicle may be used. A function of autonomous flight is not essential. A radio-controlled aerial vehicle that is remotely operated by an operator, and can travel through an assigned airspace within an assigned time period may be used.

[2-10] Devices that Provide Functions

Functions shown in figures such as FIG. 6 may be provided in a different device. For example, a drone may have all or a part of the functions provided in the server device. For example, a drone may acquire situation information, determine a retrieval procedure, and execute retrieval processing. In that case, the drone corresponds to an example of an "information-processing device" according to the present invention. Alternatively, operations performed by each function may be performed by another function. For example, flight cessation determination unit 205 may perform operations performed by abnormality detection unit 204.

Alternatively, a new function for performing operations of one of the functions may be added. For example, a new function for receiving sensor information from sensor measurement unit 203 of drone 20, which is an operation performed by flight cessation detection unit 103 in the above embodiment, may be added. Alternatively, each of the functions provided in the server device may be distributed among two or more devices. For example, flight plan acquisition unit 101 and flight instruction unit 102 may be provided in a device of an operator who flies drones 20. In short, the drone management system may include any number of devices as long as the system provides necessary functions.

[2-11] Category of Invention

The present invention may be implemented as an information-processing device (specifically, a server device), as an aerial vehicle (specifically, a drone, which may also serve as the information-processing device), or as a drone management system including the information-processing device and the aerial vehicle. The present invention also may be implemented as an information-processing method for causing each device to perform processing, or as a program for causing a computer to control each device. The program may be provided in the form of a recording medium such as an optical disk. Alternatively, the program may be downloaded to and installed in a computer via a network such the Internet.

[2-12] Procedures

The order of the processes, sequence, or flowcharts in the embodiments described in the present specification may be changed as long as consistency is maintained. Methods described in the present specification include steps arranged in an exemplary order, but the steps may be arranged in another order.

[2-13] Handling of Input/Output Information

Input or output information may be stored in a location such as memory, or may be managed in a management table. Input or output information may be overwritten, updated, or additionally written. Output information may be deleted. Input information may be sent to another device.

[2-14] Software

Software should be interpreted broadly to include instructions, instruction sets, codes, code segments, program codes, a program, a subprogram, software modules, an application, a software application, a software package, a routine, a subroutine, an object, an executable file, an execution thread, a procedure, and a function, regardless of whether it is referred to as software, firmware, middleware, microcode, hardware description language, or by any other name.

Software and instructions may be sent and received via a transmission medium. For example, software may be sent from a website, a server, or another remote source, using a wired medium such as a coaxial cable, a fiber optic cable, a twisted pair, or a digital subscriber line (DSL), and/or a wireless medium such as infrared, wireless, or microwave. The wired medium and the wireless medium are included within the definition of a transmission medium.

[2-15] Information, Signal

Information and signals described in the present specification may be represented using any of various technologies. For example, data, instructions, commands, information, signals, bits, symbols, and chips that are described in the foregoing, may be represented by voltages, currents, electromagnetic waves, magnetic fields or particles, optical fields or photons, or any combination thereof.

[2-16] System, Network

The terms "system" and "network" described in the present specification may be interchanged.

[2-17] Meaning of "Based On"

The description "based on" used in the present specification does not mean "based only on," unless explicitly stated otherwise. In other words, the description "based on" means both "based only on" and "based at least on."

[2-18] "and," "or"

In a description "A and B" or "A or B" appearing in the present specification, the conjunction "and" or "or" may be interchanged with the other as long as it does not cause inconsistency with the other descriptions.

[2-19] Variations of Embodiment

The embodiments described in the present specification may be used separately or in combination, with minor changes. A notification of information (for example, a notification of "being X") may be made explicitly or implicitly.

The present invention is described in detail in the foregoing; however, it is apparent to those ordinarily skilled in the art that the present invention is not limited to the embodiments described in the present specification. The present invention may be implemented in modified or changed embodiments, without departing from the spirit and scope of the present invention defined by the description of the claims. The description in the present specification is for illustrative purposes and is not intended to limit the present invention in any way.

REFERENCE SIGNS LIST

1 . . . Drone management system
10 . . . Server device
20 . . . Drone
30 . . . Retrieval drone
101 . . . Flight plan acquisition unit
102 . . . Flight instruction unit
103 . . . Flight cessation detection unit
104 . . . Situation information acquisition unit
105 . . . Retrieval procedure determination unit
106 . . . Retrieval processing unit
107 . . . Damage level determination unit
201 . . . Flight control unit
202 . . . Flight unit
203 . . . Sensor measurement unit
204 . . . Abnormality detection unit
205 . . . Flight cessation determination unit
301 . . . Flight control unit
302 . . . Flight unit
303 . . . Sensor measurement unit
304 . . . Image capture unit
305 . . . Status determination unit
306 . . . Hold control unit
307 . . . Retrieval unavailability notification unit

What is claimed is:

1. A flight control system comprising:
a processor configured to:
detect cessation of flight of an aerial vehicle at an unexpected site;
acquire situation information indicating a situation related to retrieval of the aerial vehicle for which the cessation of flight of the aerial vehicle has been detected;
determine a retrieval procedure for the aerial vehicle for which the cessation of flight of the aerial vehicle has been detected based on a situation indicated by acquired situation information; and
generate and transmit flight instruction data indicative of retrieval procedure information for retrieving the aerial vehicle based on the situation indicated by acquired situation information; and
a retrieval aerial vehicle configured to:
receive from the processor the flight instruction data indicative of the retrieval procedure information for retrieving the aerial vehicle;
generate flight control signals based on the received flight instruction data, and
control the flight of the retrieval aerial vehicle in accordance with the flight control signals to retrieve the aerial vehicle.

2. The flight control system according to claim 1, wherein the processor is configured to:
acquire, as situation information, information on weather in an area in which the aerial vehicle for which the cessation of flight of the aerial vehicle has been detected flies or has flown; and
upon detecting a time period having specific weather based on acquired information on weather, to determine a retrieval procedure in which the time period is designated as a retrieval time.

3. The flight control system according to claim 1, wherein the processor is configured to:
acquire, as situation information, information indicating a level of damage that is caused to a retrieval target including the aerial vehicle when the aerial vehicle ceases its flight; and
upon detecting that acquired situation information indicates a level of damage smaller than a predetermined reference level, to determine a retrieval procedure in which the retrieval target is retrieved using the retrieval aerial vehicle capable of transporting the retrieval target, and is also configured, upon detecting that the level of damage is equal to or greater than the predetermined reference level, to determine a retrieval procedure in which the retrieval target is retrieved using a means other than the retrieval aerial vehicle.

4. The flight control system according to claim 1, wherein the processor is configured to:
acquire, as situation information, information indicating a weight of a retrieval target including the aerial vehicle for which the cessation of flight of the aerial vehicle has been detected; and
upon detecting that acquired situation information indicates a weight smaller than a threshold value, to determine a retrieval procedure in which the retrieval target is retrieved using the retrieval aerial vehicle capable of transporting the retrieval target, and is also configured, upon detecting that the weight is equal to or greater than the threshold value, to determine a retrieval procedure in which the retrieval target is retrieved using a means other than the retrieval aerial vehicle.

5. The flight control system according to claim 1, wherein the processor is configured to:
acquire, as situation information, information indicating whether the aerial vehicle for which the cessation of flight of the aerial vehicle has been detected holds an object to be transported; and
upon detecting that acquired situation information is indicative that the aerial vehicle for which the detection been performed holds no object to be transported, to determine a retrieval procedure in which the aerial vehicle is retrieved using the retrieval aerial vehicle capable of transporting the aerial vehicle, and is also configured, upon detecting that the aerial vehicle for which the cessation of flight of the aerial vehicle has been detected holds an object to be transported, to determine a retrieval procedure in which a retrieval target including the aerial vehicle is retrieved using a means other than the retrieval aerial vehicle.

6. The flight control system according to any claim 1, wherein the processor is configured to:
acquire, as situation information, information indicating an attribute of an object transported by the aerial vehicle for which the cessation of flight of the aerial vehicle has been detected; and
upon detecting that acquired situation information indicates a predetermined attribute, to determine a retrieval procedure in which the aerial vehicle for which the cessation of flight of the aerial vehicle has been detected is retrieved using the retrieval aerial vehicle capable of transporting the aerial vehicle, and is also configured, upon detecting that the acquired situation information does not indicate the predetermined attribute, to determine a retrieval procedure in which a retrieval target including the aerial vehicle for which the cessation of flight of the aerial vehicle has been detected is retrieved using a means other than the retrieval aerial vehicle.

7. The flight control system according to claim 1, wherein the processor is configured to:
acquire, as situation information, information indicating whether the aerial vehicle for which the cessation of flight of the aerial vehicle has been detected has a function for unloading an object held by the aerial vehicle; and
upon detecting that acquired situation information is indicative that the aerial vehicle for which the detection been performed has the function, to determine a retrieval procedure in which the object is unloaded using the function and a retrieval procedure in which the object is retrieved using the retrieval aerial vehicle capable of transporting the object.

8. The flight control system according to claim 1, wherein the processor is configured to:
the acquisition unit is configured to acquire, as situation information, information indicating an attribute of a site at which the aerial vehicle for which the cessation of flight of the aerial vehicle has been detected can land, the site being within an area including a current position of the aerial vehicle; and
determine a retrieval procedure in which the aerial vehicle for which situation information indicating a predetermined attribute has been acquired is caused to land at a site having the predetermined attribute.

9. A flight control method comprising:
performing by a processor:
detecting cessation of flight of an aerial vehicle at an unexpected site;

acquiring situation information indicating a situation related to retrieval of the aerial vehicle for which the cessation of flight that has been detected;

determining a retrieval procedure for the aerial vehicle for which the cessation of flight that has been detected based on a situation indicated by the acquired situation information; and generating and transmitting flight instruction data indicative of retrieval procedure information to a retrieval aerial vehicle for retrieving the aerial vehicle based on the situation indicated by acquired situation information; and performing by a retrieval aerial vehicle:

receiving from the processor the flight instruction data indicative of the retrieval procedure information for retrieving the aerial vehicle;

generating flight control signals based on the received flight instruction data; and control the flight of the retrieval aerial vehicle in accordance with the flight control signals.

* * * * *